United States Patent
Iwai et al.

(10) Patent No.: US 9,145,843 B2
(45) Date of Patent: Sep. 29, 2015

(54) SPARK-IGNITION DIRECT INJECTION ENGINE

(71) Applicant: Mazda Motor Corporation, Aki-gun, Hiroshima (JP)

(72) Inventors: Kouhei Iwai, Hiroshima (JP); Masahisa Yamakawa, Hiroshima (JP); Kazuhiro Nagatsu, Hiroshima (JP); Takashi Youso, Hiroshima (JP); Keiji Araki, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 262 days.

(21) Appl. No.: 13/954,895

(22) Filed: Jul. 30, 2013

(65) Prior Publication Data

US 2014/0060490 A1   Mar. 6, 2014

(30) Foreign Application Priority Data

Aug. 29, 2012 (JP) ................. 2012-188737

(51) Int. Cl.
| | |
|---|---|
| *F02D 41/30* | (2006.01) |
| *F02D 41/34* | (2006.01) |
| *F02D 41/38* | (2006.01) |
| *F02P 5/15* | (2006.01) |
| *F02P 5/152* | (2006.01) |
| *F02D 37/02* | (2006.01) |
| *F02D 41/00* | (2006.01) |
| F02D 41/04 | (2006.01) |

(52) U.S. Cl.
CPC ............... *F02D 41/30* (2013.01); *F02D 37/02* (2013.01); *F02D 41/0025* (2013.01); *F02D 41/3029* (2013.01); *F02D 41/3836* (2013.01); *F02P 5/1502* (2013.01); *F02P 5/152* (2013.01); *F02P 5/1527* (2013.01); *F02D 2041/389* (2013.01); *F02D 2200/0611* (2013.01); *F02D 2200/101* (2013.01); *Y02T 10/46* (2013.01)

(58) Field of Classification Search
CPC ......... F02D 41/30; F02D 41/34; F02D 41/04; F02D 41/3029; F02D 41/3836; F02D 41/0025; F02D 37/02; F02D 2200/0611; F02D 2041/389; F02D 2200/101; F02P 5/1502; F02P 5/1527; F02P 5/152; Y02T 10/46
See application file for complete search history.

(56) References Cited

U.S. PATENT DOCUMENTS 6,681,739 B2 * 1/2004 Mamiya et al. ............... 123/295

FOREIGN PATENT DOCUMENTS

| JP | 2007292050 A | | 11/2007 | |
|---|---|---|---|---|
| JP | 2009091994 A | | 4/2009 | |
| JP | 2013189942 A | * | 9/2013 | ............ F02D 41/04 |

*Primary Examiner* — Hieu T Vo
(74) *Attorney, Agent, or Firm* — Alleman Hall McCoy Russell & Tuttle LLP (57) ABSTRACT

A spark-ignition direct injection engine is provided. The engine includes an engine body, a fuel injection valve, a fuel pressure setting mechanism, an ignition plug, and a controller. Within a low engine speed operating range of a predetermined high engine load range, the fuel pressure setting mechanism sets a fuel pressure to 30 MPa or above, the fuel injection valve injects fuel between late stage of compression stroke and early stage of expansion stroke, and the ignition plug performs spark-ignition after the fuel injection completes. Within a high engine speed operating range of the high engine load range, the fuel injection valve injects fuel between intake stroke to mid-stage of compression stroke, and the ignition plug performs the spark-ignition. The ignition timing is changed according to an octane number, the changing width of the ignition timing is shorter within the low engine speed range than the high engine speed range.

7 Claims, 6 Drawing Sheets

SPARK-IGNITION DIRECT INJECTION ENGINE

BACKGROUND

The present invention relates to a spark-ignition direct injection engine.

In view of improving the theoretical thermal efficiency in spark-ignition gasoline engines, it is effective to improve the geometric compression ratio thereof. For example, JP2007-292050A discloses a spark-ignition direct injection engine with a high compression ratio where its geometric compression ratio is set to 14:1 or above.

JP2009-091994A discloses an art of avoiding knock in a spark-ignition direct injection engine where compression-ignition combustion and spark-ignition combustion are switched therebetween according to an operating state of the engine, by implementing EGR and enriching an air-fuel ratio when transiting from the compression-ignition combustion to the spark-ignition combustion.

Meanwhile, such a spark-ignition gasoline engine with a high compression ratio disclosed in JP2007-292050A is advantageous in improving the thermal efficiency; however, it has a problem of easily causing knock (end gas knock) when the operating state of the engine is within a middle or high engine load range. As disclosed in JP2007-292050A, it is generally known to retard an ignition timing as a countermeasure against knock; however, the retarded ignition timing will cause a reduction of the torque.

Further, in vehicles which are set to use fuel with a high octane number (e.g., high-octane gasoline or premium gasoline) (i.e., a vehicle specified for high octane fuel), since the fuel has a high anti-knock quality, the ignition timing is set to advance so as to increase the torque. However, if fuel with a low octane number (e.g., regular gasoline) is supplied to the high octane vehicle, knock will occur more easily, and therefore, a knock control of retarding the ignition timing to avoid knock will intervene, but when the knock control intervenes, the torque decreases.

SUMMARY

The present invention is made in view of the above situations, and suppresses abnormal combustion from occurring within a high engine load range of a spark-ignition direct injection engine, and suppresses the torque from decreasing due to a low octane number of supplied fuel.

The present invention relates to a spark-ignition direct injection engine, and includes an engine body having a cylinder, a fuel injection valve for injecting fuel into the cylinder, a fuel pressure setting mechanism for setting a pressure of the fuel to be injected by the fuel injection valve, an ignition plug arranged to be oriented toward the inside of the cylinder and for igniting mixture gas within the cylinder, and a controller for operating the engine body by controlling at least the fuel injection valve, the fuel pressure setting mechanism, and the ignition plug.

When an operating state of the engine body is within a low engine speed range of a predetermined high engine load range, the controller sets the fuel pressure to be a high fuel pressure of 30 MPa or above by the fuel pressure setting mechanism, controls the fuel injection valve to perform the fuel injection at least in a period from a late stage of compression stroke to an early stage of expansion stroke, and controls the ignition plug after the fuel injection completes to perform a spark-ignition of the mixture gas within the cylinder. When the operating state of the engine body is within a high engine speed range of the high engine load range where the engine speed is above the low engine speed range, the controller controls the fuel injection valve to perform the fuel injection at least in a period from intake stroke to a middle stage of the compression stroke, and controls the ignition plug at a predetermined timing to perform the spark-ignition of the mixture gas within the cylinder.

The controller changes the ignition timing of the ignition plug according to an octane number of the fuel. A changing width of the ignition timing according to the octane number is shorter within the low engine speed range of the high engine load range than within the high engine speed range of the high engine load range.

Here, "the predetermined high engine load range" may be a high engine load range when the engine operating range is divided with respect to the level of the engine load into two ranges of high engine load range and low engine load range, or it may also be a high engine load range or high and middle engine load ranges when the engine operating range is divided into three ranges of high engine load range, middle engine load range, and low engine load range.

Further, "the late stage of the compression stroke" and "the middle stage of the compression stroke" may be a late stage and a middle stage of the compression stroke when the compression stroke is divided into three periods of early stage, middle stage, and late stage; and similarly, "the early stage of the expansion stroke" may be an early stage of the compression stroke when the compression stroke is divided into three periods of early stage, middle stage, and the late stage.

Moreover, "the changing width of the ignition timing" may be a changing period of time of the ignition timing, or it may also be a changing crank angle of the ignition timing.

According to this configuration, when the operating state of the engine body is within the low engine speed range of the predetermined high engine load range, the fuel pressure may be the high fuel pressure of 30 MPa or above, and the fuel injection valve is controlled to inject the fuel at least in the period from the late stage of the compression stroke to the early stage of the expansion stroke.

By increasing the fuel pressure, the injection amount that is injected per unit time increases. When comparing the pressures at the same fuel injection amount, the higher fuel pressure shortens the period of injecting fuel into the cylinder (i.e., injection period). This is advantageous in comparatively shortening the time period from the start of the fuel injection to the compression ignition.

Further, the high fuel pressure is advantageous in atomizing the fuel spray injected into the cylinder, and along with the fuel injection at the high fuel pressure, a turbulence inside the cylinder near the compression top dead center (CTDC) is increased, and the turbulence energy inside the cylinder is increased. These factors improve mixing characteristics of the fuel inside the cylinder near the CTDC, and comparatively homogeneous burnable mixture gas can be formed in a short period of time.

Thus, the ignition plug is controlled at the predetermined timing after the fuel injection has ended, to perform a spark ignition to the mixture gas inside the cylinder. The ignition timing may be, for example, a predetermined timing after the CTDC.

As described above, injecting the fuel into the cylinder at the high fuel pressure increases the turbulence energy inside the cylinder. Since the injection timing of the fuel is set near the CTDC, the period from the start of the injection to the spark-ignition becomes short, and spark-ignition combustion can be started in a state where the high turbulence energy is maintained. This allows an early flame propagation and shortens a combustion period of the spark-ignition combustion.

Thus, within the low engine speed range of the high engine load range, injecting the fuel into the cylinder at the high fuel pressure at the comparatively late timing near the CTDC can shorten the injection period, a mixture gas forming period, and the combustion period. Shortening a reactable period of mixture gas, which is the sum of the injection period, the mixture gas forming period, and the combustion period, can effectively avoid abnormal combustion such as pre-ignition and knock, etc. Thus, since devising the injecting mode of the fuel can avoid the abnormal combustion, within the low engine speed range of the high engine load range, the retarding of the ignition timing to avoid the abnormal combustion becomes unnecessary, and the ignition timing can be advanced as much as possible. This is advantageous in increasing the torque.

Whereas, within the high engine speed range of the high engine load range, the fuel injection is performed in at least a period from an early stage of the intake stroke to the middle stage of the compression stroke, and the ignition plug is controlled at the predetermined timing to perform a spark ignition to the mixture gas inside the cylinder.

If the fuel injection timing is retarded to near the CTDC, since there will be no fuel inside the cylinder on the compression stroke as described above, the air at a high ratio of specific heat is compressed, and within the high engine speed range of high engine load range, the temperature at the CTDC becomes excessively high and disadvantageous regarding knock. Therefore, within the high engine speed range of high engine load range, the fuel injection is performed at least in the period from the intake stroke to the middle stage of the compression stroke. Here, the fuel pressure may be, similar to the above description, set to the high fuel pressure of 30 MPa or above; however, it is not necessary to set to such high fuel pressure. By injecting the fuel into the cylinder at a comparatively early timing, during the compression stroke, the gas containing the fuel at a comparatively low ratio of specific heat is compressed, and therefore, the temperature increase of the gas inside the cylinder is suppressed, and the temperature at the CTDC can be lowered. As a result, the abnormal combustion can also be effectively avoided within the high engine speed range of the high engine load range.

Further, the controller changes the ignition timing of the ignition plug according to the octane number of the fuel. Specifically, when high octane fuel which hardly causes knock (e.g., high octane gasoline or premium gasoline) is supplied to the engine body, the ignition timing is set to a relatively advanced timing. On the other hand, when low octane fuel which easily causes the knock (e.g., regular gasoline) is supplied to the engine body, by setting the ignition timing to a relatively retarded timing, the knock can be suppressed. For example, while the ignition timing is optimized on the assumption that the high octane fuel is supplied, a knock sensor for detecting or predicting the occurrence of knock is attached to the engine body and the ignition timing is retarded when the knock may occur based on the detection result of the knock sensor. Thus, when the high octane fuel is supplied to the engine body, the ignition timing is optimized. On the other hand, when the low octane fuel is supplied to the engine body, in order to avoid knock, the ignition timing is more retarded than the optimum timing. As a result, according to the difference in the octane number of the fuel, the ignition timing of the ignition plug is changed.

In such control of changing the ignition timing according to the octane number of the fuel, the controller may relatively narrow the changing width of the ignition timing corresponding to the difference in the octane number when the operating state of the engine body is within the low engine speed range of the high engine load range as described above.

The phrase "relatively narrow the changing width of the ignition timing" means that the ignition timing is not retarded, or hardly retarded even when the low octane fuel is supplied at the ignition timing optimized for the high octane fuel. This is because, as described above, when the operating state of the engine body is within the low engine speed range of the high engine load range, the fuel injection timing is set to a retarded timing of at least between the late stage of the compression stroke and the early stage of the expansion stroke.

Specifically, for example, when the fuel is injected into the cylinder during the intake stroke, under the environment in the cylinder where the temperature and pressure during the compression stroke gradually rise, the low octane fuel becomes faster in chemical reaction speed than the high octane fuel. As a result, after the spark-ignition combustion has started, if the low octane fuel is injected, the knock occurs easier than when the high octane fuel is injected. In contrast, setting the fuel injection timing to a late timing at least between the late stage of the compression stroke and the early stage of the expansion stroke means that the fuel does not exist inside the cylinder in the first place during the compression stroke period where the chemical reaction speed of the low octane fuel becomes faster. Therefore, the difference in chemical reaction speed between the high octane fuel and the low octane fuel hardly occurs.

Therefore, when the operating state of the engine body is within the low engine speed range of the high engine load range, by injecting the fuel at the high fuel pressure at a late timing of at least between the late stage of the compression stroke and the early stage of the expansion stroke, even when the low octane fuel is supplied, the knock is hardly caused similarly to the high octane fuel. Therefore, the width for changing the ignition timing becomes narrow (in other words, the ignition timing is not changed or is hardly changed). This becomes advantageous in suppressing the reduction of the torque even when the low octane fuel (e.g., regular gasoline) is supplied to the engine body which is set to use the high octane fuel (e.g., premium gasoline) (i.e., vehicle specified for the high octane fuel).

Whereas, when the operating state of the engine is within the high engine speed range of the high engine load range, the controller relatively expands the changing width of the ignition timing corresponding to the octane number. In other words, with respect to the ignition timing optimized for the high octane fuel, when the low octane fuel is supplied, the ignition timing is retarded. This is because, within the high engine speed range of the high engine load range, as described above, the fuel ignition timing is set to at least from the early stage of the intake stroke to the middle stage of the compression stroke, and when the low octane fuel is supplied, the knock occurs relatively easily.

Within the low engine speed range of the high engine load range, the controller may fix the ignition timing regardless of the octane number.

Thus, within the low engine speed range of the high engine load range, because the ignition timing may be set the same regardless of the difference in the octane number of the fuel to be supplied to the engine body, and thus, even when, for example, regular gasoline is supplied to a vehicle specified for the high octane fuel, the reduction of the torque can be suppressed while knock is avoided.

A piston may be reciprocatably inserted into the cylinder, and a concaved cavity may be formed on a top face of the piston. Within the low engine speed range of the high engine load range, the controller may control the fuel injection valve at the timing at which the fuel is injected into the cavity.

Within the low engine speed range of the high engine load range, by injecting the fuel at a high fuel pressure into the cavity formed on the top face of the piston, the flow of gas inside the cavity increases. This rapidly forms the burnable mixture gas while increasing an air utilization ratio and is advantageous in shortening the combustion period. Therefore, in the cavity, in other words, in a compact combustion chamber, the mixture gas can be rapidly combusted, and the abnormal combustion (e.g. knock) can be avoided more effectively. Since this allows to effectively avoid the abnormal combustion (e.g. knock) even when the low octane fuel is supplied, the ignition timing optimized with respect to the high octane fuel is hardly retarded, and the reduction of the torque is suppressed.

The fuel injection valve may be a multi-hole type and arranged in a center part of a combustion chamber of the engine body, and the fuel injection valve may be set to radially inject the fuel into the cavity in the period from the late stage of the compression stroke to the early stage of the expansion stroke.

According to this configuration, the combination of the multi-hole type injector and the cavity is advantageous in shortening the mixture gas forming period and the combustion period after the fuel injection.

When the operating state of the engine body is within the high engine speed range of the high engine load range, the controller may set the fuel pressure to be a low fuel pressure of below 30 MPa by the fuel pressure setting mechanism, and may control the fuel injection valve to perform the fuel injection at least in the period from intake stroke to the middle stage of the compression stroke.

According to this configuration, since the fuel is injected in the period from the intake stroke to the middle stage of the compression stroke, it is unnecessary to increase the fuel pressure. Thus, the unnecessary work of increasing the fuel pressure can be omitted. In other words, in order to effectively avoid the abnormal combustion within the high engine speed range of the high engine load range, the gas containing fuel with a comparatively low ratio of specific heat is compressed during the compression stroke, and the temperature increase of the gas inside the cylinder is suppressed to suppress the in-cylinder gas temperature at the CTDC (the temperature at the CTDC). Thus, the fuel pressure does not need to be increased. Therefore, within the high engine speed range of the high engine load range, by setting the fuel pressure to the low fuel pressure of below 30 MPa, the unnecessary work of increasing the fuel pressure can be omitted.

When the octane number of the fuel is relatively low, the controller may retard the ignition timing when the operating state of the engine body within the predetermined high engine load range with respect to when the octane number of the fuel is relatively high. A time length corresponding to the changing width of the ignition timing according to the difference of the octane number may be shorter within the low engine speed range of the high engine load range than within the high engine speed range of the high engine load range.

According to this configuration, when the operating state of the engine body is within the low engine speed range of the high engine load range, by injecting the fuel at the high fuel pressure at a late timing of at least between the late stage of the compression stroke and the early stage of the expansion stroke, even when the low octane fuel is supplied, the knock is hardly caused similarly to the high octane fuel. Therefore, the width for changing the ignition timing becomes narrow (in other words, the ignition timing is not changed or is hardly changed). This becomes advantageous in suppressing the reduction of the torque even when the low octane fuel (e.g., regular gasoline) is supplied to the engine body which is set to use the high octane fuel (e.g., premium gasoline) (i.e., vehicle specified for the high octane fuel).

Whereas, when the operating state of the engine is within the high engine speed range of the high engine load range, the controller relatively expands the changing width of the ignition timing corresponding to the octane number. In other words, with respect to the ignition timing optimized for the high octane fuel, when the low octane fuel is supplied, the ignition timing is retarded. This is because, within the high engine speed range of the high engine load range, as described above, the fuel ignition timing is set to at least from the early stage of the intake stroke to the middle stage of the compression stroke, and when the low octane fuel is supplied, the knock occurs relatively easily.

The ignition plug of the cylinder may include a plurality of plugs. When the operating state of the engine body is within the high engine speed range of the predetermined high engine load range, the controller may control the plurality of plugs to perform a multi-point ignition.

According to this configuration, within the high engine speed range of the high engine load range where the fuel injection is performed in the period from the intake stroke to the middle stage of the compression stroke, the plurality of plugs are controlled and the multi-point ignition is performed to create a plurality of fire sources inside the cylinder, and because the flame spreads from each fire source, the flame spreads rapidly and the combustion period can be shortened. The shortened combustion period is advantageous in improving the thermal efficiency even when the ignition timing is significantly retarded when the octane number of the fuel is low. In other words, by adopting the multi-hole injection, the ignition timing can be significantly retarded when the octane number of the fuel is low.

DETAILED DESCRIPTION OF EMBODIMENT

Figure 1:
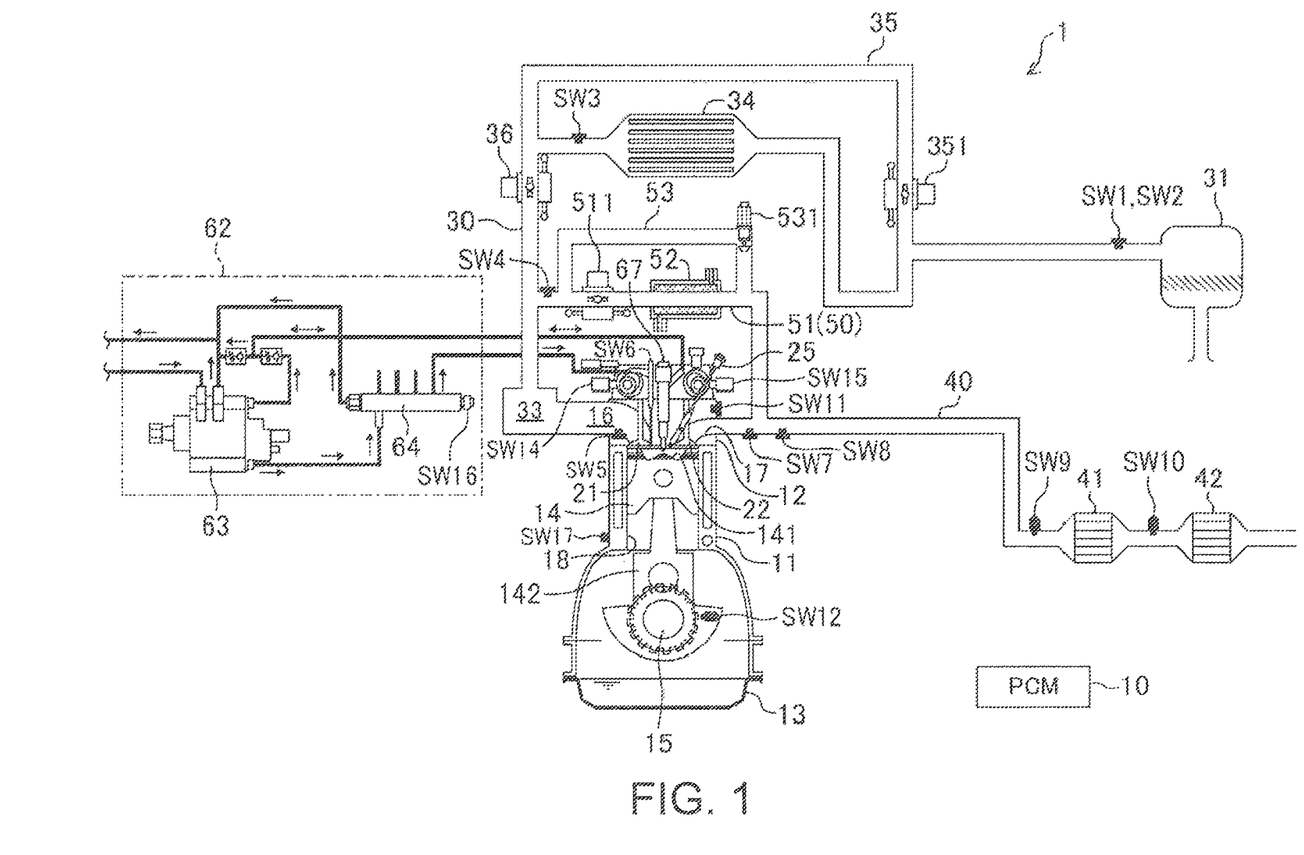
FIG. 1 is a schematic diagram showing a configuration of a spark-ignition direct injection engine.
Figure 2:
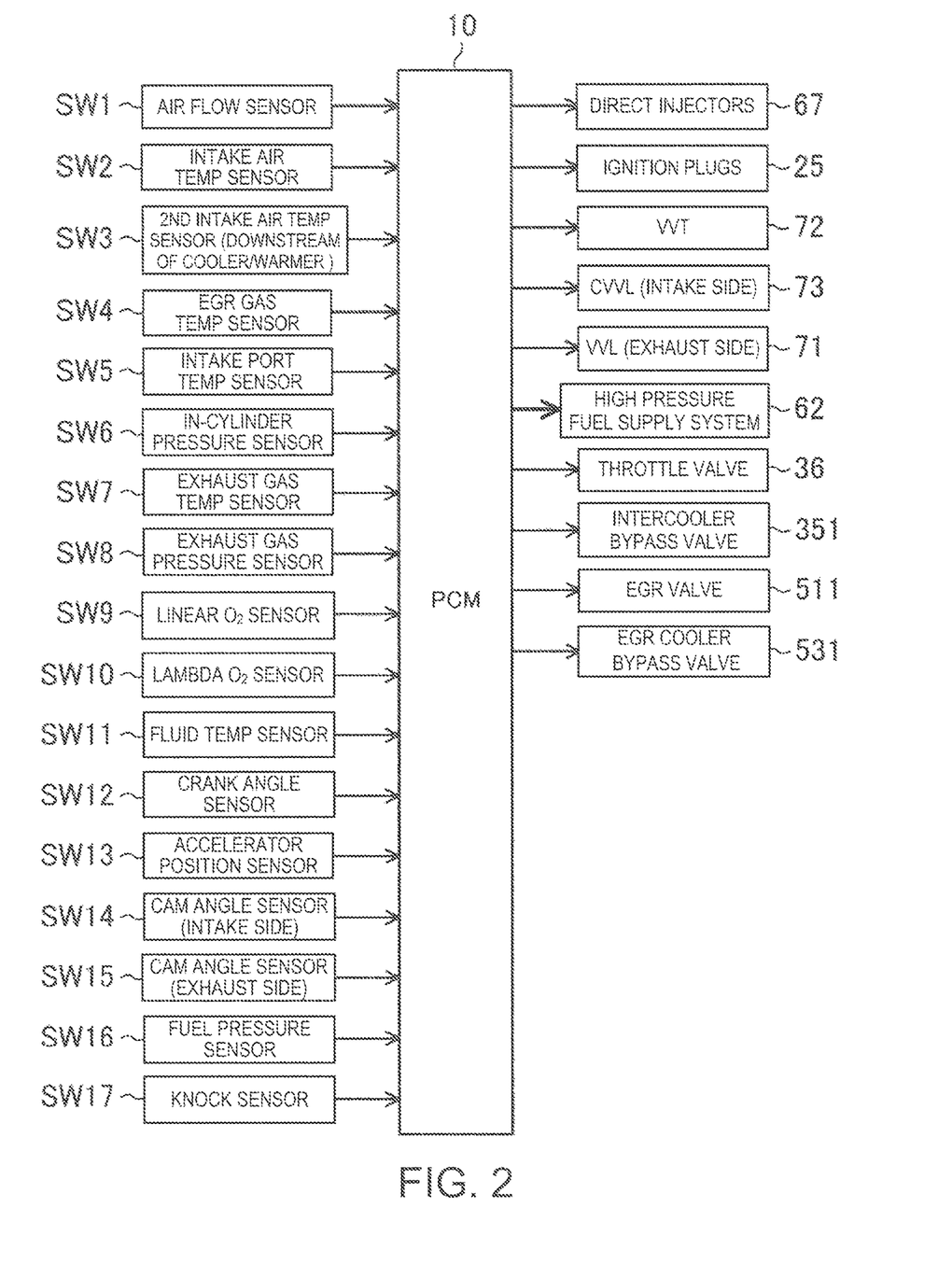
FIG. 2 is a block diagram relating to a control of the spark-ignition direct injection engine.
Figure 3:
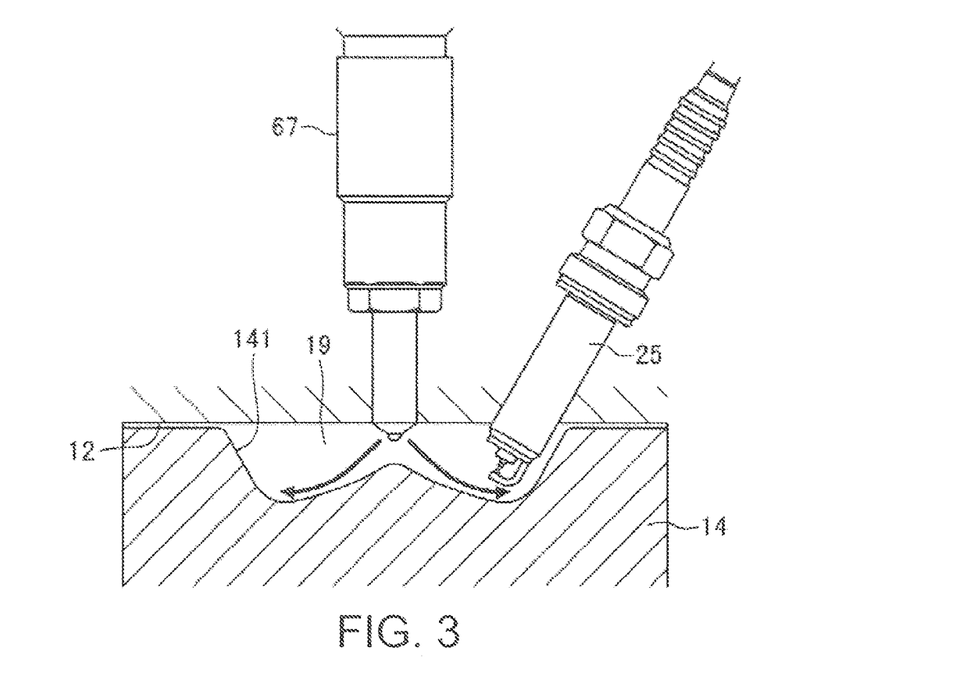
FIG. 3 is an enlarged cross-sectional view showing a combustion chamber.

Hereinafter, a spark-ignition direct injection engine according to an embodiment of the present invention is described in detail with reference to the appended drawings. The following description of the preferred embodiments is an illustration. FIGS. 1 and 2 show a schematic configuration of an engine 1 (engine body) of this embodiment. The engine 1 is a spark-ignition gasoline engine that is equipped in a vehicle and supplied with fuel containing at least gasoline. The engine 1 includes a cylinder block 11 provided with a plurality of cylinders 18 (note that, although only one cylinder is illustrated in FIG. 1, here, four cylinders are linearly provided, for example), a cylinder head 12 arranged on the cylinder block 11, and an oil pan 13 arranged below the cylinder block 11 and where a lubricant is stored. Inside the cylinders 18, reciprocating pistons 14 coupled to a crankshaft 15 via connecting rods 142, respectively, are fitted. As shown in FIG. 3 in an enlarged manner, a cavity 141 having a reentrant shape such as the one used in a diesel engine, is formed on a top face of each piston 14. When the piston 14 is at a position near a compression top dead center (CTDC), the cavity 141 faces toward an injector 67 described later. The cylinder head 12, the cylinders 18, and the pistons 14 are each formed with the cavity 141 partition combustion chambers 19. Note that, the shape of the combustion chamber 19 is not limited to the shape in the illustration. For example, the shape of the cavity 141, the shape of the top face of the piston 14, and the shape of a ceiling part of the combustion chamber 19 may suitably be changed.

A geometric compression ratio of the engine 1 is set comparatively high to be 15:1 or above so as to improve a theoretical thermal efficiency and stabilize compression-ignition combustion (described later). Note that, the geometric compression ratio may suitably be set within a range of 15:1 to about 20:1.

In the cylinder head 12, an intake port 16 and an exhaust port 17 are formed, and an intake valve 21 for opening and closing the opening of the intake port 16 on the combustion chamber 19 side and an exhaust valve 22 for opening and closing the opening of the exhaust port 17 on the combustion chamber 19 side are arranged for each of the cylinders 18.

In a valve train system of the engine 1 for operating the intake and exhaust valves 21 and 22, a mechanism such as a hydraulically-actuated variable valve mechanism 71 (see FIG. 2, hereinafter, may be referred to as the VVL (Variable Valve Lift)) for switching an operation mode of the exhaust valve 22 between a normal mode and a special mode is provided on an exhaust side. The VVL 71 (the detailed configuration is not illustrated) is configured to include two kinds of cams with different cam profiles from each other in which a first cam has one cam nose and a second cam has two cam noses; and a lost motion mechanism for selectively transmitting an operation state of either one of the first and second cams to the exhaust valve. When the lost motion mechanism transmits the operation state of the first cam to the exhaust valve 22, the exhaust valve 22 operates in the normal mode where it opens only once during the exhaust stroke. On the other hand, when the lost motion mechanism transmits the operation state of the second cam to the exhaust valve 22, the exhaust valve 22 operates in the special mode where it opens once during the exhaust stroke and once more during the intake stroke, which is a so called an exhaust open-twice control. The normal and special modes of the VVL 71 are switched therebetween according to an operating state of the engine. Specifically, the special mode is utilized for a control related to an internal EGR. Hereinafter, the processing of operating the VVL 71 in the normal mode so as not to perform the exhaust open-twice control may be referred to as "turning the VVL 71 off," and the processing of operating the VVL 71 in the special mode so as to perform the exhaust open-twice control may be referred to as "turning the VVL 71 on." Note that, an electromagnetically-operated valve system for operating the exhaust valve 22 by using an electromagnetic actuator may be adopted for switching between the normal and special modes. Further, the execution of the internal EGR is not limited to the exhaust open-twice control, and it may be achieved through, for example, an internal EGR control by an intake open-twice control or through an internal EGR control where burned gas is left in the cylinder 18 by setting a negative overlap period where both of the intake and exhaust valves 21 and 22 are closed during the exhaust stroke or the intake stroke.

While the valve train system on the exhaust side is provided with the VVL 71, as shown in FIG. 2, a phase variable mechanism 72 (hereinafter, may be referred as the VVT (Variable Valve Timing)) for changing a rotational phase of an intake camshaft with respect to the crankshaft 15 and a lift variable mechanism 73 (hereinafter, may be referred as the CVVL (Continuously Variable Valve Lift) for continuously changing a lift of the intake valve 21 are provided on an intake side of the valve train system. A well-known hydraulic, electromagnetic or mechanical structure may suitably be adopted for the VVT 72 (a detailed structure is not illustrated). Further, various kinds of well-known structure may suitably be adopted for the CVVL 73 (a detailed structure is not illustrated). Open and close timings and the lift of the intake valve 21 can be changed by the VVT 72 and the CVVL 73, respectively.

For each cylinder 18, the injector 67 for directly injecting the fuel into the cylinder 18 is attached to the cylinder head 12. As shown in an enlarged manner in FIG. 3, a nozzle hole of the injector 67 is arranged in a center part of the ceiling face of the combustion chamber 19 to be oriented toward the inside of the combustion chamber 19. The injector 67 directly injects the fuel into the combustion chamber 19 by an amount according to the operating state of the engine 1 at an injection timing set according to the operating state of the engine 1. In this embodiment, the injector 67 (a detailed configuration is not illustrated) is a multi hole injector formed with a plurality of nozzle holes. Thus, the injector 67 injects the fuel so that the fuel spray spreads radially from the central position of the combustion chamber 19. As indicated by the arrows in FIG. 3, at a timing corresponding to the piston 14 reaching the position near the CTDC, the fuel spray injected to spread radially from the center part of the combustion chamber 19 flows along a wall surface of the cavity 141 formed on the piston top face. Therefore, it may be said that the cavity 141 is formed to contain therewithin the fuel spray injected at the timing corresponding to the piston 14 reaching the position near the CTDC. The combination of the multi hole injector 67 and the cavity 141 is advantageous in, after the fuel is injected, shortening a mixture gas forming period and the combustion period. Note that, the injector 67 is not limited to the multi hole injector, and may be an outward opening valve type injector.

A fuel supply path couples between a fuel tank (not illustrated) and the injectors 67. A fuel supply system 62 having a fuel pump 63 and a common rail 64 and for supplying the fuel to each of the injectors 67 at a comparatively high fuel pressure is provided within the fuel supply path. The fuel pump 63 pumps the fuel from the fuel tank to the common rail 64, and the common rail 64 can accumulate the pumped fuel at a comparatively high fuel pressure. By opening the nozzle holes of the injector 67, the fuel accumulated in the common rail 64 is injected from the nozzle holes of the injector 67. Here, the fuel pump 63 is a plunger type pump (not illustrated) and is operated by the engine 1. The fuel supply system 62 including the engine-operated pump enables the supply of fuel to the injector 67 at a high fuel pressure of 30 MPa or above. The fuel pressure may be set to about 120 MPa at the maximum. As described later, the pressure of the fuel to be supplied to the injector 67 is changed according to the operating state of the engine 1. Note that, the fuel supply system 62 is not limited to the above configuration.

Further, in the cylinder head 12, as shown in FIG. 3, an ignition plug 25 for igniting mixture gas inside the combustion chamber 19 is attached for each cylinder 18. In this embodiment, the ignition plug 25 is arranged penetrating the cylinder head 12 so as to extend obliquely downward from the exhaust side of the engine 1. As shown in FIG. 3, a tip of the ignition plug 25 is oriented toward the inside of the cavity 141 of the piston 14 at the CTDC.

On one side surface of the engine 1, as shown in FIG. 1, an intake passage 30 is connected to communicate with each of the intake ports 16 of the cylinders 18. On the other side of the engine 1, an exhaust passage 40 is connected to lead out the burned gas (exhaust gas) discharged from each of the combustion chambers 19 of the cylinders 18.

An air cleaner 31 for filtrating intake air is arranged in an upstream end part of the intake passage 30. A surge tank 33 is arranged near a downstream end of the intake passage 30. A part of the intake passage 30 downstream of the surge tank 33 is branched to become independent passages extending toward the respective cylinders 18, and downstream ends of the independent passages are connected with the intake ports 16 of the cylinders 18, respectively.

A water-cooled type intercooler/warmer 34 for cooling or heating air and a throttle valve 36 for adjusting an intake air amount to each cylinder 18 are arranged between the air cleaner 31 and the surge tank 33 in the intake passage 30. Further, an intercooler bypass passage 35 for bypassing the intercooler/warmer 34 is connected within the intake passage 30, and an intercooler bypass valve 351 for adjusting an air flow rate passing through the passage 35 is arranged within the intercooler bypass passage 35. A ratio of a flow rate of the intercooler bypass passage 35 and a flow rate of the intercooler/warmer 34 are adjusted through adjusting an opening of the intercooler bypass valve 351, and thus, a temperature of fresh air to be introduced into the cylinder 18 can be adjusted.

An upstream part of the exhaust passage 40 is constituted with an exhaust manifold having independent passages branched toward the respective cylinders 18 and connected with respective external ends of the exhaust ports 17, and a manifold section where the independent passages merge together. In a part of the exhaust passage 40 on the downstream side of the exhaust manifold, a direct catalyst 41 and an underfoot catalyst 42 are connected as an exhaust emission control system for purifying hazardous components contained in the exhaust gas. Each of the direct catalyst 41 and the underfoot catalyst 42 includes a cylinder case and, for example, a three-way catalyst arranged in a flow passage within the case.

A part of the intake passage 30 between the surge tank 33 and the throttle valve 36 is connected with a part of the exhaust passage 40 on the upstream side of the direct catalyst 41 via an EGR passage 50 for recirculating a part of the exhaust gas to the intake passage 30. The EGR passage 50 includes a main passage 51 arranged with an EGR cooler 52 for cooling the exhaust gas by an engine coolant, and an EGR cooler bypass passage 53 for bypassing the EGR cooler 52. An EGR valve 511 for adjusting a recirculation amount of the exhaust gas to the intake passage 30 is arranged within the main passage 51. An EGR cooler bypass valve 531 for adjusting a flow rate of the exhaust gas flowing through the EGR cooler bypass passage 53 is arranged within the EGR cooler bypass passage 53.

The diesel engine 1 with the configuration as described above is controlled by a powertrain control module 10 (hereinafter, may be referred to as the PCM). The PCM 10 is configured with a CPU, a memory, a counter timer group, an interface, and a microprocessor with paths for connecting these units. The PCM 10 configures the controller.

As shown in FIGS. 1 and 2, detection signals of various kinds of sensors SW1 to SW16 are inputted to the PCM 10. The various kinds of sensors include the following sensors: an air flow sensor SW1 for detecting the flow rate of the fresh air and an intake air temperature sensor SW2 for detecting the temperature of the fresh air and that are arranged on the downstream side of the air cleaner 31; a second intake air temperature sensor SW3 arranged on the downstream side of the intercooler/warmer 34 and for detecting the temperature of the fresh air after passing through the intercooler/warmer 34; an EGR gas temperature sensor SW4 arranged near a connecting part of the EGR passage 50 with the intake passage 30 and for detecting the temperature of external EGR gas; an intake port temperature sensor SW5 attached to the intake port 16 and for detecting the temperature of the intake air immediately before flowing into the cylinder 18; an in-cylinder pressure sensor SW6 attached to the cylinder head 12 and for detecting the pressure inside the cylinder 18; an exhaust gas temperature sensor SW7 and an exhaust gas pressure sensor SW8 arranged near a connecting part of the exhaust passage 40 with the EGR passage 50 and for detecting the exhaust gas temperature and pressure, respectively; a linear $O_2$ sensor SW9 arranged on the upstream side of the direct catalyst 41 and for detecting an oxygen concentration within the exhaust gas; a lambda $O_2$ sensor SW10 arranged between the direct catalyst 41 and the underfoot catalyst 42 and for detecting an oxygen concentration within the exhaust gas; a fluid temperature sensor SW11 for detecting a temperature of the engine coolant; a crank angle sensor SW12 for detecting a rotational angle of the crankshaft 15; an accelerator position sensor SW13 for detecting an accelerator opening corresponding to an angle of an acceleration pedal (not illustrated) of the vehicle; an intake cam angle sensor SW14 and an exhaust cam angle sensor SW15; and a fuel pressure sensor SW16 attached to the common rail 64 of the fuel supply system 62 and for detecting the fuel pressure to be supplied to the injector 67.

Moreover, as shown in FIG. 1, the cylinder block 11 of the engine 1 is attached with a knock sensor SW17 for detecting vibrations of the cylinder block 11 to detect or predict occurrence of knock. The detection value of the knock sensor SW17 is also inputted to the PCM 10 as shown in FIG. 2.

By performing various kinds of operations based on these detection signals, the PCM 10 determines the state of the engine 1, and furthers the vehicle, and outputs control signals to the injectors 67, the ignition plugs 25, the VVT 72 and CVVL 73 on the intake valve side, the VVL 71 on the exhaust valve side, the fuel supply system 62, and the actuators of the various kinds of valves (throttle valve 36, intercooler/warmer bypass valve 351, the EGR valve 511, and the EGR cooler bypass valve 531) according to the determined state. In this manner, the PCM 10 operates the engine 1.

Figure 4:
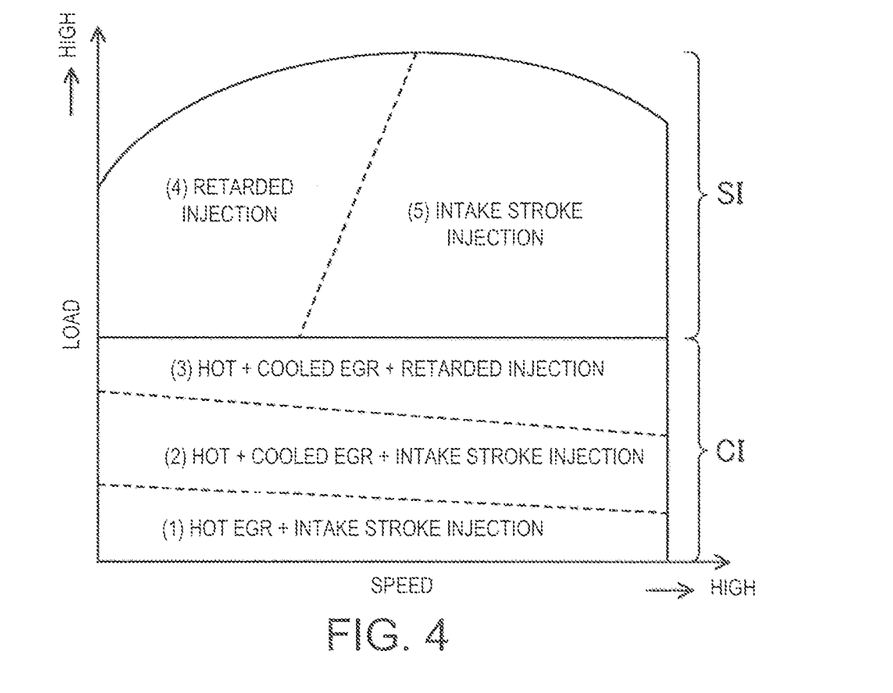
FIG. 4 is a chart exemplifying an operating range of the engine.

FIG. 4 shows one example of an operating range of the engine 1. Within a low engine load range where an engine load is relatively low, the engine 1 does not perform an ignition by the ignition plug 25 and performs compression-ignition combustion in which a combustion is generated by compression self-ignition, so as to improve fuel consumption and exhaust emission performance. However, with the compression-ignition combustion, the speed of the combustion becomes excessively rapid as the engine load increases, and thus, causes a problem of combustion noises, etc. Therefore, with the engine 1, within a high engine load range where the engine load is relatively high, the compression-ignition combustion is suspended and is switched to a spark-ignition combustion using the ignition plug 25. As described above, the engine 1 is configured to switch a combustion mode according to the operating state of the engine 1, particularly the load of the engine 1, between a CI (Compression-Ignition) mode where the compression-ignition combustion is performed and an SI (Spark-Ignition) mode where the spark-ignition combustion is performed. Note that, the boundary line of switching the mode is not limited to the example in the illustration.

Figure 5A:
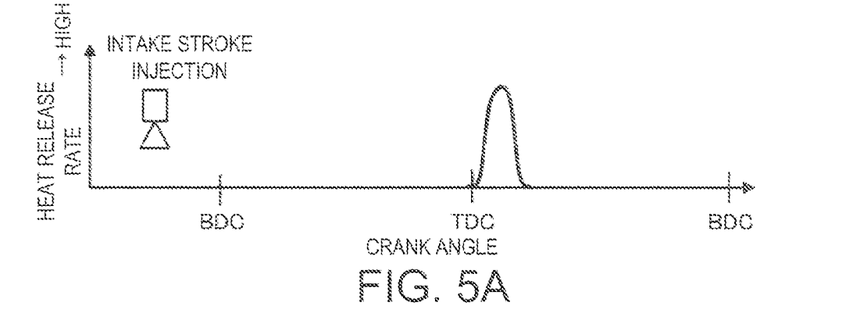
FIG. 5A shows one example of a fuel injection timing in a case where an intake stroke injection is performed in a CI mode, and a heat release rate of a CI combustion caused thereby.

The CI mode is divided into three ranges according to the levels of the engine load. Specifically, within a range (1) with the lowest engine load in the CI mode, hot EGR gas is introduced into the cylinder 18 to improve the ignitability and stability of the compression-ignition combustion. This is achieved by turning the VVL 71 on and performing the exhaust open-twice control of opening the exhaust valve 22 during the intake stroke. The introduction of the hot EGR gas increases an in-cylinder temperature at the CTDC, and is advantageous in improving the ignitability and stability of the compression-ignition combustion within the range (1) with low engine load. Moreover, within the range (1), as shown in FIG. 5A, the injector 67 injects the fuel into the cylinder 18 at least in a period between the intake stroke and the middle stage of the compression stroke, and thus homogeneous lean mixture gas is formed. An air excess ratio λ of the mixture gas may be set to, for example, 2.4:1 or higher to enable the suppression of the generation of Raw NOx and improve the exhaust emission performance. Thus, as shown in FIG. 5A, the lean mixture gas is compressed to self-ignite near the CTDC.

Within a part of the range (1) with higher engine load than other parts, specifically, the part including the boundary between the range (1) and a range (2), even though the fuel is injected into the cylinder 18 at least during the period between the intake stroke and the middle stage of the compression stroke, the air-fuel ratio of the mixture gas is set to a theoretical air-fuel ratio ($\lambda \approx 1$). By setting the theoretical air-fuel ratio in this manner, a three-way catalyst can be used, and as described later, by setting the air-fuel ratio of the mixture gas to the theoretical air-fuel ratio even in the SI mode, the control of switching between the SI and CI modes is simplified, contributing in expanding the CI mode applicable range to the high load range side.

In the CI mode, within the range (2) with higher engine load than the range (1), similar to the higher engine load part of the range (1), the fuel is injected into the cylinder 18 at least in the period between the intake stroke and the middle stage of the compression stroke (see FIG. 5A), and the homogeneous mixture gas at the theoretical air-fuel ratio ($\lambda \approx 1$) is formed.

Moreover, within the range (2), since the temperature inside the cylinder 18 naturally increases according to the increase of the engine load, the hot EGR gas amount is reduced to avoid pre-ignition. This reduction is achieved by adjusting the open and close timings of the intake and exhaust valves 21 and 22 to adjust the internal EGR gas amount to be introduced into the cylinder 18. Moreover, by adjusting the amount of external EGR gas bypassing the EGR cooler 52, the amount of hot EGR gas may be adjusted.

Furthermore, within the range (2), cooled EGR gas is introduced into the cylinder 18. Thus, by introducing the hot EGR gas at a high temperature and the cooled EGR gas at a low temperature into the cylinder 18 at a suitable ratio, the temperature inside the cylinder 18 at the CTDC is adjusted appropriately, a rapid combustion is avoided while securing the ignitability of the compression-ignition, and the compression-ignition combustion is stabilized. Note that, an EGR ratio (a ratio of the total EGR gas of the hot EGR gas and the cooled EGR gas introduced into the cylinder 18) is set as high as possible under the condition that the air fuel ratio of the mixture gas is set to achieve $\lambda \approx 1$. Therefore, within the range (2), the fuel injection amount increases as the engine load increases, and thus, the EGR ratio gradually reduces.

Figure 5B:
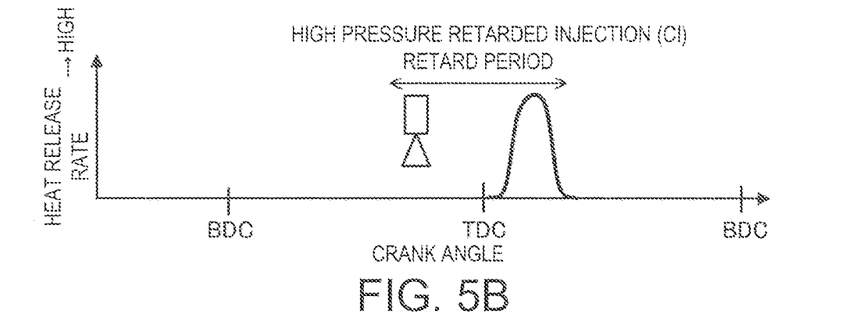
FIG. 5B shows one example of a fuel injection timing in a case where a high pressure retarded injection is performed in the CI mode, and a heat release rate of the CI combustion caused thereby.

Within a range (3) with the highest engine load in the CI mode which includes a switching boundary between the CI mode and the SI mode, if the fuel is injected into the cylinder 18 in the period between the intake stroke and the middle stage of the compression stroke, it causes abnormal combustion such as pre-ignition. On the other hand, if a large amount of cooled EGR gas is introduced to reduce the in-cylinder temperature at the CTDC, then the ignitability of the compression-ignition will degrade. In other words, since the compression-ignition combustion cannot be performed stably only by controlling the temperature inside the cylinder 18, within the range (3), by devising the fuel injection mode in addition to the temperature control of the cylinder 18, the compression-ignition combustion can be stabilized while avoiding the abnormal combustion, such as pre-ignition. Specifically, in the fuel injection mode, as shown in FIG. 5B, the fuel is injected into the cylinder 18 at least in a period between a late stage of the compression stroke and an early stage of the expansion stroke (hereinafter, the period is referred to as the retard period) at a significantly higher fuel pressure compared to the conventional mode. Hereinafter, this characteristic fuel injection mode is referred to as the "high pressure retarded injection" or simply "retarded injection." By the high pressure retarded injection, the compression-ignition combustion can be stabilized while avoiding the abnormal combustion within the range (3). The details of the high pressure retarded injection will be described later.

Within the range (3), the hot EGR gas and the cooled EGR gas are introduced into the cylinder 18 at a suitable ratio similarly to the range (2). Thus, the temperature inside the cylinder 18 at the CTDC is adjusted appropriately and the compression-ignition combustion is stabilized.

While the CI mode has three divided ranges according to the engine load, the SI mode is divided into two ranges (4) and (5) according to the engine speed. When the operating range of the engine 1 is divided into two higher and lower speed ranges, in FIG. 4, the range (4) corresponds to the lower engine speed range and the range (5) corresponds to the higher engine speed range. Although in the operating ranges shown in FIG. 4, the boundary between the ranges (4) and (5) extending with respect to the engine load is inclined in the engine speed direction, the boundary is not limited to the illustrated example.

Within each of the ranges (4) and (5), the mixture gas is set to the theoretical air-fuel ratio ($\lambda \approx 1$) similar to the ranges (2) and (3). Therefore, the air-fuel ratio of the mixture gas is fixed at the theoretical air-fuel ratio ($\lambda \approx 1$) over the boundary between the CI mode and the SI mode, and this enables the use of a three-way catalyst. Moreover, within the ranges (4) and (5), the throttle valve 36 is basically fully opened and the fresh air amount and the external EGR gas amount to be introduced into the cylinder 18 are adjusted by the opening adjustment of the EGR valve 511. Such adjustment of the ratio of gas introduced into the cylinder 18 reduces a pumping loss, and by introducing a large amount of EGR gas into the cylinder 18, the combustion temperature of the spark-ignition combustion is suppressed low enough to reduce a cooling loss. Within the ranges (4) and (5), the external EGR gas cooled mainly by passing through the EGR cooler 52 is introduced into the cylinder 18. Thus, it becomes advantageous to avoid the abnormal combustion as well as to suppress the generation of Raw NOx. Note that, within a full engine load range, the EGR valve 511 is fully closed to cancel the external EGR.

The geometric compression ratio of the engine 1 is, as described above, set to 15:1 or above (e.g., 18:1). Since a high compression ratio increases the in-cylinder temperature and the in-cylinder pressure at the CTDC, it is advantageous in stabilizing the compression-ignition combustion in the CI mode, especially within the low engine load range of the CI mode (e.g., the range (1)). Whereas, in the SI mode that is the high engine load range, this high compression ratio engine 1 causes a problem that the abnormal combustion (e.g., pre-ignition and knock) easily occurs.

Figure 5C:
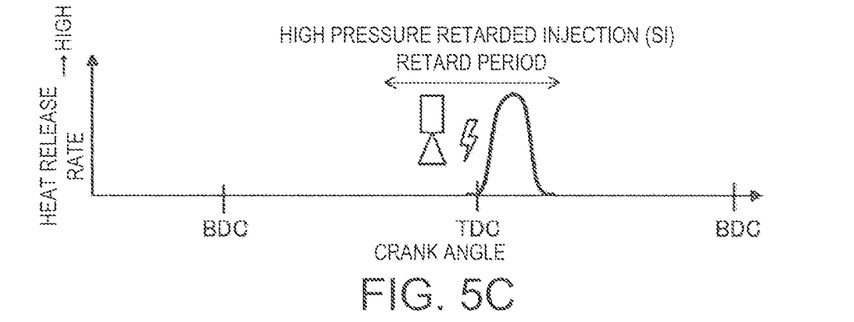
FIG. 5C shows one example of a fuel injection timing and an ignition timing in a case where the high pressure retarded injection is performed in an SI mode, and a heat release rate of the SI combustion caused thereby.

Thus, with the engine 1, the high pressure retarded injection is performed within the range (4) that is on the lower engine speed side of the SI mode to avoid the abnormal combustion. Specifically, within the range (4), at a high fuel pressure of 30 MPa or above, as shown in FIG. 5C, only the high pressure retarded injection is performed, in which the fuel is injected into the cylinder 18 in the retard period between the late stage of the compression stroke and the early stage of the expansion stroke.

Next, the high pressure retarded injection in the SI mode is described with reference to FIG. 6, which shows charts comparing differences in a heat release rate (upper chart) and an extent of reaction of unburned mixture gas (lower chart) between an SI combustion caused by the high pressure retarded injection described above (solid line) and the conventional SI combustion in which the fuel injection is performed during the intake stroke (broken line). The lateral axis in FIG. 6 indicates the crank angle. The comparison is performed under a condition that the operating state of the engine 1 is within the lower engine speed range on the high engine load side (i.e., the range (4)), and a fuel amount to be injected is the same between the SI combustion caused by the high pressure retarded injection and the conventional SI combustion.

First, for the conventional SI combustion, a predetermined amount of fuel is injected into the cylinder 18 during the intake stroke (broken line in the upper chart). After the fuel is injected, a comparatively homogeneous mixture gas is formed inside the cylinder 18 before the piston 14 reaches the CTDC. Further, in this case, the ignition is at a predetermined timing indicated by the first white circle after the CTDC, and then the combustion starts. After the combustion starts, as indicated by the broken line in the upper chart of FIG. 6, the combustion ends after progressing through a peak of the heat release rate. A period from the start of the fuel injection until the end of the combustion corresponds to a reactable time length of unburned mixture gas (hereinafter, may simply be referred to as the reactable time length) and, as indicated by the broken line in the lower chart of FIG. 6, the reaction of the unburned mixture gas gradually progresses within the reactable time length. The dotted line in the lower chart indicates an ignition threshold (i.e., a reactivity of the unburned mixture gas being ignited). The conventional SI combustion has, in combination with within the low engine speed range, an extremely long reactable time length, and the reaction of the unburned mixture gas keeps progressing for the reactable time length, and therefore, the reactivity of the unburned mixture gas exceeds the ignition threshold around the ignition timing, causing the abnormal combustion such as pre-ignition and knock.

On the other hand, the high pressure retarded injection aims to avoid the abnormal combustion by shortening the reactable time length. As shown in FIG. 6, the reactable time length in this case is a total time length of a period where the injector 67 injects the fuel ((1) an injection period), a period from the end of the injection until burnable mixture gas is formed around the ignition plug 25 ((2) a mixture gas forming period), and a period from the start of the combustion started by the ignition until the combustion ends ((3) a combustion period), in other words, (1)+(2)+(3). The high pressure retarded injection shortens each of the injection periods, the mixture gas forming period, and the combustion period, and thereby, shortens the reactable time length. The methods of shortening the periods are explained sequentially.

First, a high fuel pressure relatively increases the amount of fuel injected from the injector 67 per unit of time. Therefore, in a case where the fuel injection amount is fixed, a relation between the fuel pressure and the injection period of the fuel substantially becomes as follows: the injection period extends as the fuel pressure decreases, and the injection period contracts as the fuel pressure increases. Therefore, the high pressure retarded injection in which the fuel pressure is set significantly higher than the conventional pressure shortens the injection period.

Further, the high fuel pressure is advantageous in atomizing the fuel spray injected into the cylinder 18 and further extends a spreading distance of the fuel spray. Therefore, a relation between the fuel pressure and a fuel vaporization time length substantially becomes as follows: the fuel vaporization time length extends as the fuel pressure decreases, and the fuel vaporization time length contracts as the fuel pressure increases. Further, a relation between the fuel pressure and a time length for the fuel spray to reach around the ignition plug 25 (the fuel spray reaching time length) substantially becomes as follows: the fuel spray reaching time length extends as the fuel pressure decreases, and the fuel spray reaching time length contracts as the fuel pressure increases. The mixture gas forming period corresponds to a total time length of the fuel vaporization time length and the fuel spray reaching time length to around the ignition plug 25; therefore, the mixture gas forming period contracts as the fuel pressure increases. Therefore, the high pressure retarded injection in which the fuel pressure is set significantly higher than the conventional pressure shortens the fuel vaporization time length and the fuel spray reaching time length to around the ignition plug 25 and, as a result, shortens the mixture gas forming period. On the other hand, as indicated by the white circle of the chart in FIG. 6, with the conventional intake stroke injection with the low fuel pressure, the mixture gas forming period is significantly longer. Note that, the combination of the multi hole injector 67 and the cavity 141 shortens the time length from the end of the fuel injection until when the fuel spray reaches around the ignition plug 25 and, as a result, becomes advantageous in shortening the mixture gas forming period.

As described above, shortening the injection period and the mixture gas forming period enables to retard the injection timing of the fuel, more precisely, retard the injection start timing to a comparatively late timing. Therefore, as shown in the upper chart of FIG. 6, with the high pressure retarded injection, the fuel injection is performed within the retard period between the late stage of the compression stroke and the early stage of the expansion stroke. Although, due to injecting the fuel into the cylinder 18 at the high fuel pressure, the turbulence of flow inside the cylinder becomes stronger and a turbulence kinetic energy inside the cylinder 18 increases, the high turbulence kinetic energy is, in combination with retarding the fuel injection timing to the comparatively late timing, advantageous in shortening the combustion period.

In other words, in a case where the fuel injection is performed within the retard period, a relation between the fuel pressure and the turbulence kinetic energy within the combustion period substantially becomes as follows: the turbulence kinetic energy decreases as the fuel pressure decreases, and the turbulence kinetic energy increases as the fuel pressure increases. Here, even if the fuel is injected into the cylinder 18 at the high fuel pressure, in the case where the injection timing is on the intake stroke, due to the time length until the ignition timing being long and inside the cylinder 18 being compressed on the compression stroke after the intake stroke, the turbulence inside the cylinder 18 is subsided. As a result, in the case where the fuel injection is performed during the intake stroke, the turbulence kinetic energy within the combustion period becomes comparatively low regardless of the fuel pressure.

A relation between the turbulence kinetic energy within the combustion period and the combustion period substantially becomes as follows: the combustion period extends as the turbulence kinetic energy decreases and the combustion period contracts as the turbulence kinetic energy increases. Therefore, a relation between the fuel pressure and the combustion period becomes as follows: the combustion period extends as the fuel pressure decreases and the combustion period contracts as the fuel pressure increases. In other words, the high pressure retarded injection shortens the combustion period. On the other hand, with the conventional intake stroke injection with the low fuel pressure, the combustion period extends. Note that, the multi hole injector 67 is advantageous in increasing the turbulence kinetic energy inside the cylinder 18 and is effective in shortening the combustion period. Moreover, it is also effective in shortening the combustion period to keep the fuel spray contained within the cavity 141 by the combination of the multi hole injector 67 and the cavity 141.

Figure 6:
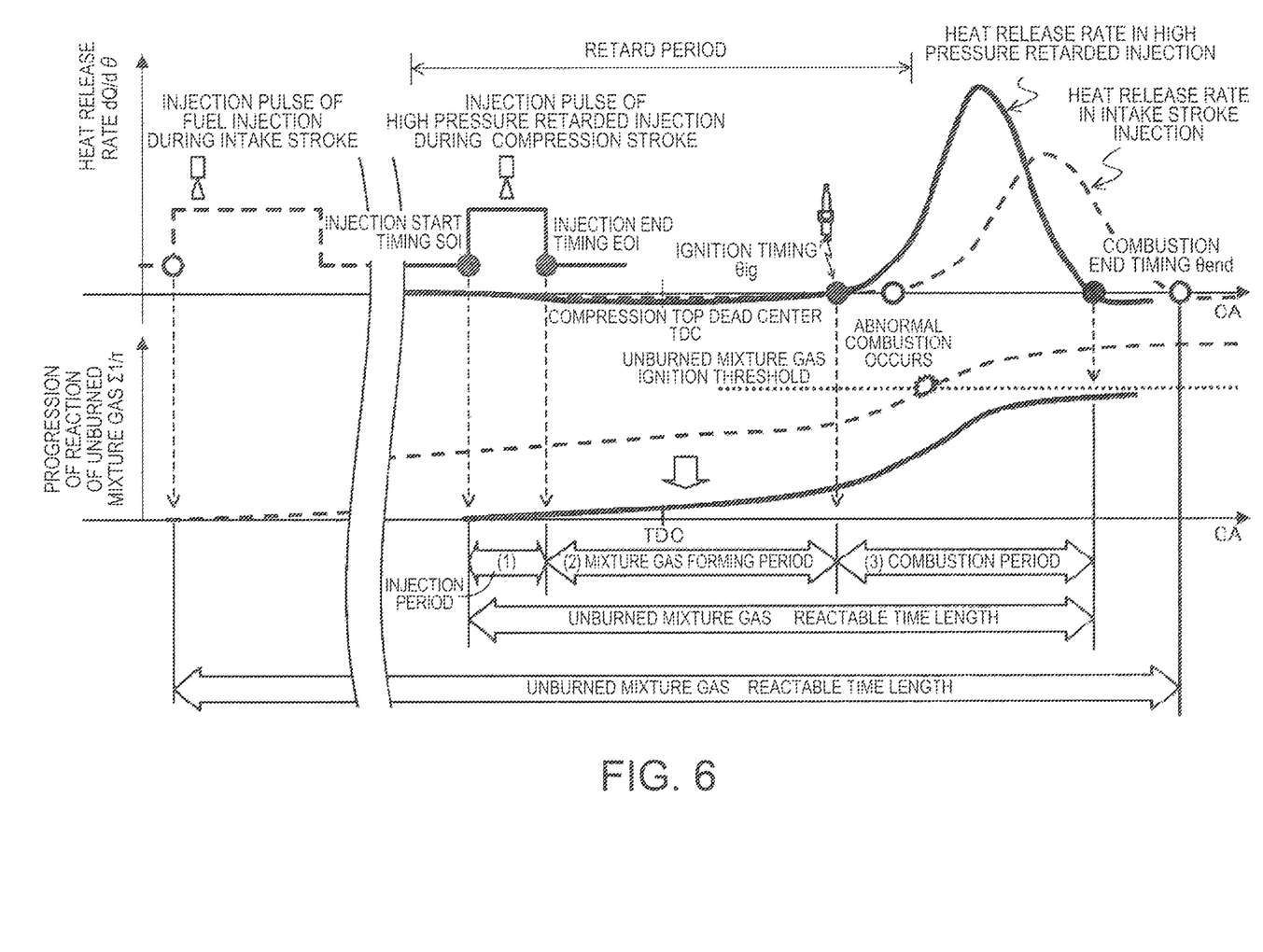
FIG. 6 shows charts comparing the state of an SI combustion caused by the high pressure retarded injection with the state of the conventional SI combustion.

As described above, the high pressure retarded injection shortens each of the injection periods, the mixture gas forming period, and the combustion period, and as a result, as shown in FIG. 6, the high pressure retarded injection can significantly shorten the reactable time length of the unburned mixture gas from a fuel injection start timing SOI to a combustion end timing θend compared to the conventional case where the fuel injection is performed during the intake stroke. As a result of shortening the reactable time length, as shown in the upper chart of FIG. 6, while the extent of reaction of the unburned mixture gas when the combustion ends exceeds the ignition threshold and the abnormal combustion occurs with the conventional intake stroke injection with the low fuel pressure as indicated by the white circle, with the high pressure retarded injection, as indicated by the black circle, the progression of the reaction of the unburned mixture gas at when the combustion ends is suppressed and the abnormal combustion can be avoided. Note that, the ignition timings for cases indicated by the white and black circles in the upper chart of FIG. 6 are set to be the same timing.

By setting the fuel pressure to, for example, 30 MPa or above, the combustion period can effectively be shortened. Moreover, the fuel pressure of 30 MPa or above can also effectively shorten the injection period and the mixture gas forming period. Note that, the fuel pressure may be suitably set according to a type of fuel to be used which at least contains gasoline. The upper limit value of the fuel pressure may be 120 MPa, etc.

The high pressure retarded injection avoids the occurrence of abnormal combustion in the SI mode by devising the mode of the fuel injection into the cylinder 18. Other than such high pressure retarded injection, it has conventionally been known to avoid the abnormal combustion by retarding the ignition timing. The retarded ignition timing suppresses the increases of the temperature and pressure of the unburned mixture gas and, thereby, suppresses the progression of the reaction of the unburned mixture gas. However, while the retarded ignition timing causes degradation of the thermal efficiency and a reduction of the torque, when the high pressure retarded injection is performed, since the abnormal combustion is avoided by devising the mode of the fuel injection, the ignition timing can be advanced, and thus, the thermal efficiency can be improved and the torque can be increased. In other words, the high pressure retarded injection can, not only avoid the abnormal combustion, but also enable the advancement of the ignition timing accordingly, and thereby, is advantageous in improving the fuel consumption.

As described above, the high pressure retarded injection in the SI mode can shorten each of the injection periods, the mixture gas forming period, and the combustion period, while the high pressure retarded injection performed within the range (3) of the CI mode can shorten the injection period and the mixture gas forming period. In other words, by injecting the fuel into the cylinder 18 at the high fuel pressure to increase the turbulence inside the cylinder 18, the atomized fuel is more finely mixed, and even when the fuel is injected at the late timing near the CTDC, the comparatively homogeneous mixture gas can be swiftly formed.

In the high pressure retarded injection in the CI mode, by injecting the fuel at the late timing near the CTDC within the comparatively high engine load range, substantially homogeneous mixture gas is swiftly formed as described above while preventing pre-ignition in, for example, a compression stroke period. Therefore, after the CTDC, the compression ignition can surely be performed. Further, by performing the compression-ignition combustion in an expansion stroke period where the pressure inside the cylinder 18 due to the motoring, the combustion subsides, and excessive increase of the pressure (dP/dt) inside the cylinder 18 decreases due to the compression-ignition combustion can be avoided. Thus, the restriction of NVH is released and, as a result, the range of the CI mode applicable range extends to the high load range side.

Back to the SI mode, as described above, in the high pressure retarded injection in the SI mode, although the reactable time length of the unburned mixture gas is shortened by performing the fuel injection in the retard period, since the fuel injection timing is set to near the CTDC, on the compression stroke, the in-cylinder gas that does not include the fuel, in other words, air at a high specific heat ratio is compressed. As a result, within the high engine speed range, the temperature inside the cylinder 18 at the CTDC increases, and the increased temperature at the CTDC causes knock. Therefore, when the retarded injection is performed within the range (5), there may be a case where it is required to retard the ignition timing to avoid knock.

Figure 5D:
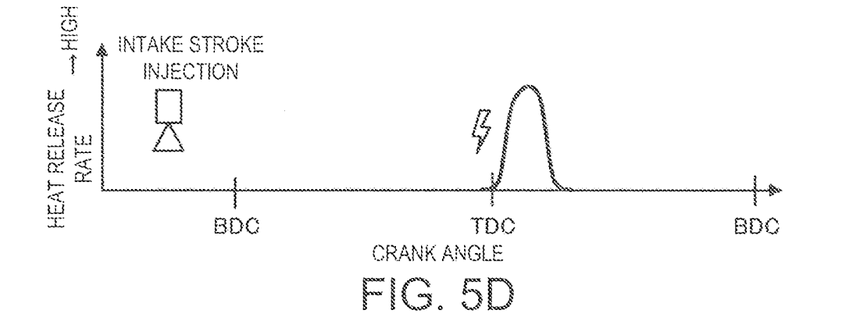
FIG. 5D shows one example of a fuel injection timing and an ignition timing in a case where split injections of the intake stroke injection and the high pressure retarded injection are performed in the SI mode, and a heat release rate of the SI combustion caused thereby.

Therefore, within the range (5) where the engine speed is relatively high in the SI mode, as shown in FIG. 5D, the fuel is injected into the cylinder 18 in the intake stroke period without performing the retarded injection. Here, the intake stroke period is a period where the intake valve 21 is opened and which is defined based on the open and close timings of the intake valve 21, and not based on the piston position. In other words, the intake stroke period may be offset with respect to the timing at which the piston reaches an intake bottom dead center (IBDC) depending on the close timing of the intake valve 21 which is changed by the CVVL 73 and the VVT 72. Thus, it can be rephrased that the fuel is injected in the period from the intake stroke to the middle stage of the compression stroke within the range (5).

With the intake stroke injection, the specific heat ratio of the in-cylinder gas on the compression stroke (i.e., the mixture gas including the fuel) may be reduced to suppress the in-cylinder temperature at the CTDC. Since knock can be suppressed by decreasing the in-cylinder temperature at the CTDC, the ignition timing can be advanced. Thus within the range (5), by performing the intake stroke injection, the thermal efficiency can be improved while avoiding the abnormal combustion.

Note that, a multi-point ignition system may be provided to the engine 1 to shorten the combustion period within the higher engine speed range (5). Specifically, a plurality of ignition plugs may be arranged to be oriented toward the inside of the combustion chamber, and within the range (5), the intake stroke injection is performed as well as each of the plurality of ignition plugs is operated to perform a multi-point ignition. In this case, since a flame spreads from each of the plurality of fire sources inside the combustion chamber 19, the flame spreads rapidly and the combustion period becomes shorter. As a result, the combustion period is shortened within the higher engine speed range (5), and this shortened combustion period is advantageous in improving the thermal efficiency.

(Knock Control)

The PCM 10 performs a knock control of retarding the ignition timing from a predetermined base ignition timing set to obtain a maximum engine torque. Thus, the PCM 10 detects or predicts the occurrence of knock in the engine 1 based on the output signal of the knock sensor SW17, so as to avoid the occurrence of knock. Here, an anti-knock quality changes depending on an octane number of the fuel supplied to the engine 1, and fuel with a higher octane number (e.g., high octane gasoline or premium gasoline) causes less knock compared to fuel with a lower octane number (e.g., regular gasoline). Therefore, in a high octane vehicle which is set to use high octane gasoline or premium gasoline, the base ignition timing is set to a relatively advancing side compared to a vehicle which is set to use regular gasoline.

In such a high octane vehicle, when the regular gasoline is supplied to the engine 1, normally, knock easily occurs. With the intervention of the knock control described above, the PCM 10 retards the ignition timing from the base ignition timing according to the detection signal of the knock sensor SW17.

However, with a vehicle equipped with the engine 1, when the operating state of the engine 1 is within the range (4), by the high pressure retarded injection, abnormal combustion (e.g., knock) can effectively be avoided even with regular gasoline or high octane gasoline (or premium gasoline). Specifically, when the fuel is injected into the cylinder 18 on the intake stroke, in the environment inside of the cylinder where the temperature and the pressure gradually increase during the following compression stroke period, a chemical reaction speed of the regular gasoline with a relatively low octane number is faster than that of the high octane gasoline or the premium gasoline. As a result, after the combustion starts by the spark ignition, knock occurs more easily with the regular gasoline than the high octane gasoline or the premium gasoline.

On the other hand, with the retarded injection where the fuel injection timing is set to a late timing which is at least in a period from the late stage of the compression stroke to the early stage of the expansion stroke, the fuel does not exist in the first place within the cylinder 18 during the compression stroke period where the chemical reaction speed of the regular gasoline becomes fast. Therefore, a difference in the chemical reaction speed is unlikely to be produced between the high octane gasoline (or the premium gasoline) and the regular gasoline.

Therefore, even if the regular gasoline is supplied to the engine 1 of the high octane vehicle, since knock is unlikely to occur when the operating state of the engine 1 is within the range (4), the ignition timing is not retarded more than the base ignition timing, or hardly retarded. As a result, the reduction of the torque due to the regular gasoline being supplied is suppressed.

Figure 7:
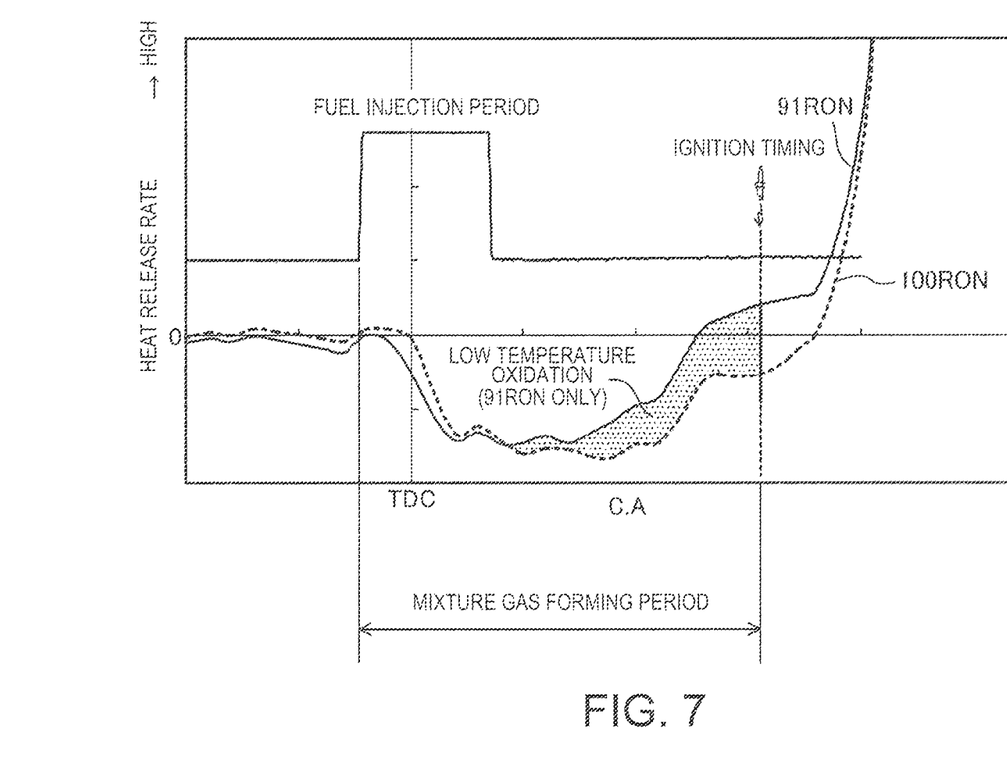
FIG. 7 is a chart comparing heat release rates of different octane numbers when the SI combustion caused by the high pressure retarded injection is performed.

Here, the heat release rate when the SI combustion is performed by the high pressure retarded injection is compared between when using the regular gasoline and when using the high octane gasoline (or the premium gasoline) with reference to FIG. 7, in which the solid line corresponds to 91RON (i.e., regular gasoline), and the broken line corresponds to 100RON (i.e., high octane gasoline or premium gasoline). Note that, between the two kinds of fuel, the fuel injection periods are both set to be near the CTDC, and the ignition timings are also both set to the same predetermined timing after the CTDC. Therefore, the two kinds of fuel have the same mixture gas forming period from the injection start timing to the ignition timing.

Firstly, discussing about the high octane gasoline (or the premium gasoline), as described above, due to that the fuel injection into the cylinder 18 starts from a predetermined timing before the CTDC, for a predetermined period of time thereafter, fuel droplets exist within the cylinder 18 and, thus, the heat release rate becomes a negative value. When using the high octane gasoline or the premium gasoline, the negative heat release rate continues until the ignition timing, the spark ignition is performed to start a hot flame reaction, and the heat release rate rises.

On the other hand, when using the regular gasoline, although the heat release rate becomes a negative value due to the fact that the fuel injection into the cylinder 18 starts from a predetermined timing before the CTDC similarly to the high octane gasoline or the premium gasoline, a low temperature oxidation reaction occurs after the fuel injection period, and the heat release rate rises. Note that, since the period from the start of the fuel injection to the ignition timing is short due to performing the high pressure retarded injection, the spark ignition is performed before progressing to a self-ignition, the hot flame reaction starts at the same timing as the high octane gasoline or the premium gasoline, and the heat release rate rises. As it is clear from comparing the solid line with the broken line in FIG. 7, the rise of the heat release rate when using the regular gasoline has no substantial difference from the rise of the heat release rate when using the high octane gasoline or the premium gasoline. In other words, the high pressure retarded injection can obtain a predetermined ignitability by the spark ignition even without the low temperature oxidation reaction as in the case of using the high octane gasoline or the premium gasoline.

Therefore, even if the regular gasoline is supplied to the engine 1 of the high octane vehicle, within the range (4) where the SI combustion is performed by the high pressure retarded injection, the occurrence of knock is avoided and the reduction of the torque is avoided even without retarding the ignition timing.

On the other hand, within the range (5) where the SI combustion is performed without the high pressure retarded injection, since the fuel injection is performed during the intake stroke period, knock easily occurs when the regular gasoline is supplied. Thus, the PCM 10 retards the ignition timing according to the detection signal of the knock sensor SW17.

Therefore, with the engine 1, within the range (4) which is the lower engine speed range on the high engine load side, the fuel injection is performed at least in the retard period from the late stage of the compression stroke to the early stage of the expansion stroke at the high fuel pressure of 30 MPa or above, after the fuel injection is completed, the ignition plug is operated at the predetermined timing. Whereas, within the range (5) which is the higher engine speed range on the high engine load side, the fuel injection is performed at least in the period from the early stage of the intake stroke to the middle stage of the compression stroke, the ignition plug is operated at the predetermined timing near the CTDC (see FIG. 4 and FIGS. 5C and 5D). Within the range (4), a width of differing the ignition timing according to the difference of the octane number, in other words, a crank angle amount of the ignition retard or a time length of the ignition retard, is shorter than a crank angle amount of the ignition retard or a time length of the ignition retard within the range (5). Alternatively, the ignition timing is fixed within the range (4) with respect to the difference of the octane number.

Particularly, as described above, in the high pressure retarded injection, since the fuel is injected from the multi hole injector 67 into the cavity 141 on the top face of the piston, the flow of the gas within the cavity 141 increases and burnable mixture gas can be swiftly formed while improving the air utilization rate. Moreover, the mixture gas can be combusted due to the compact combustion chamber within the cavity 141. Thus, since the abnormal combustion (e.g., knock) can more effectively be avoided even when the regular gasoline with a relatively low octane number is supplied, the torque reduction can be suppressed.

Note that, the application of the art disclosed herein is not limited to the engine configuration described above. For example, the fuel injection in the intake stroke period may be performed into the intake port 16 by a port injector separately provided in the intake port 16, instead of the injector 67 provided in the cylinder 18.

Moreover, the engine 1 is not limited to the in-line four cylinder engine described above, and may be applied to an in-line three cylinder engine, an in-line two cylinder engine, an in-line six cylinder engine, etc. Further, the engine 1 is applicable to various kinds of engines, such as a V6 engine, a V8 engine, and a flat-four engine.

Further, in the description above, the air-fuel ratio of the mixture gas for the predetermined operating range is set to the theoretical air-fuel ratio ($\lambda \approx 1$); however, the air-fuel ratio of the mixture gas may be set lean. Note that, the setting of the air-fuel ratio to the theoretical air-fuel ratio has an advantage that a three-way catalyst can be used.

The operating ranges shown in FIG. 4 are merely an example, and other various operating ranges may be provided.

Moreover, the high pressure retarded injection may be split injections as needed. Similarly, the intake stroke injection may also be split injections as needed. With these split injections, the fuel may be injected on the intake stroke and the compression stroke.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS

1 Engine (Engine Body)
10 PCM (Controller)
14 Piston
141 Cavity
18 Cylinder
25 Ignition Plug
62 Fuel Supply System (Fuel Pressure Setting Mechanism)
67 Injector (Fuel Injection Valve)

The invention claimed is:

1. A spark-ignition direct injection engine, comprising:
an engine body having a cylinder;
a fuel injection valve for injecting fuel into the cylinder;
a fuel pressure setting mechanism for setting a pressure of the fuel to be injected by the fuel injection valve;
an ignition plug arranged to be oriented toward an inside of the cylinder and for igniting mixture gas within the cylinder; and
a controller for operating the engine body by controlling at least the fuel injection valve, the fuel pressure setting mechanism, and the ignition plug,
wherein when an operating state of the engine body is within a low engine speed range of a predetermined high engine load range, the controller sets the fuel pressure to be a high fuel pressure of 30 MPa or above by the fuel pressure setting mechanism, controls the fuel injection valve to perform the fuel injection at least in a period from a late stage of compression stroke to an early stage of expansion stroke, and controls the ignition plug after the fuel injection completes to perform a spark-ignition of the mixture gas within the cylinder,
wherein when the operating state of the engine body is within a high engine speed range of the high engine load range where the engine speed is above the low engine speed range, the controller controls the fuel injection valve to perform the fuel injection at least in a period from intake stroke to a middle stage of the compression stroke, and controls the ignition plug at a predetermined timing to perform the spark-ignition of the mixture gas within the cylinder, and
wherein the controller changes the ignition timing of the ignition plug according to an octane number of the fuel, a changing width of the ignition timing according to the octane number is shorter within the low engine speed range of the high engine load range than within the high engine speed range of the high engine load range.

2. The engine of claim 1, wherein within the low engine speed range of the high engine load range, the controller fixes the ignition timing regardless of the octane number.

3. The engine of claim 1, wherein a piston is reciprocatably inserted into the cylinder, and a concaved cavity is formed on a top face of the piston, and
wherein within the low engine speed range of the high engine load range, the controller controls the fuel injection valve at the timing at which the fuel is injected into the cavity.

4. The engine of claim 3, wherein the fuel injection valve is a multi-hole type and arranged in a center part of a combustion chamber of the engine body, and the fuel injection valve is set to radially inject the fuel into the cavity in the period from the late stage of the compression stroke to the early stage of the expansion stroke.

5. The engine of claim 1, wherein when the operating state of the engine body is within the high engine speed range of the high engine load range, the controller sets the fuel pressure to be a low fuel pressure of below 30 MPa by the fuel pressure setting mechanism, and controls the fuel injection valve to perform the fuel injection at least in the period from intake stroke to the middle stage of the compression stroke.

6. The engine of claim 1, wherein when the octane number of the fuel is relatively low, the controller retards the ignition timing when the operating state of the engine body within the predetermined high engine load range with respect to when the octane number of the fuel is relatively high, and a time length corresponding to the changing width of the ignition timing according to the difference of the octane number is shorter within the low engine speed range of the high engine load range than within the high engine speed range of the high engine load range.

7. The engine of claim 1, wherein the ignition plug of the cylinder is one of a plurality of plugs, and wherein when the operating state of the engine body is within the high engine speed range of the predetermined high engine load range, the controller controls the plurality of plugs to perform a multi-point ignition.

\* \* \* \* \*